United States Patent [19]

Ross

[11] 4,159,503
[45] Jun. 26, 1979

[54] ELECTRIC BRANCH-LINE COMBINER WITH GROUNDING

[76] Inventor: Frederick W. Ross, 755 Klamath Dr., Del Mar, Calif. 92014

[21] Appl. No.: 849,851

[22] Filed: Nov. 9, 1977

Related U.S. Application Data

[63] Continuation of Ser. No. 740,125, Nov. 8, 1976, abandoned.

[51] Int. Cl.² .................... H01H 47/22; G01R 31/02
[52] U.S. Cl. ..................................... 361/187; 307/71; 307/127; 307/147; 361/42
[58] Field of Search ................. 361/42, 187; 307/42, 307/43, 71, 127, 141, 142, 147; 324/51

[56] References Cited

U.S. PATENT DOCUMENTS

| | | | |
|---|---|---|---|
| 2,721,307 | 10/1955 | Bowles | 361/187 |
| 3,293,452 | 12/1966 | Horwitz et al. | 361/187 |
| 3,735,248 | 5/1973 | Reese | 361/187 |
| 3,991,320 | 11/1976 | Ross | 307/71 |

*Primary Examiner*—Gerald Goldberg

[57] ABSTRACT

An electric branch-line combiner is disclosed by which double power at double voltage is obtainable from two branch-line outlets of a typical existing branch-line circuit interconnected to a typical three-wire electric power source and by which electrical grounding means are readily, conveniently and safely obtained directly from two such existing branch outlets, each having only two contactors.

18 Claims, 3 Drawing Figures

ELECTRIC BRANCH-LINE COMBINER WITH GROUNDING

This application is a continuation of application Ser. No. 740,125, filed Nov. 8, 1976, now abandoned.

CROSS REFERENCE TO RELATED APPLICATION

This invention relates to improvements in electric branch-line combiners of the type set forth in my copending application Ser. No. 587,205 filed June 16, 1975, now U.S. Pat. No. 3,991,320.

BACKGROUND OF THE INVENTION

My copending application, Ser. No. 587,205, discloses electrical circuitry in which the electrical output from two separate branch outlets as are commonly available in existing bulidings, can be combined to provide twice as much power than is available from each separate branch outlet without exceeding the power rating of each such branch outlet.

Existing branch-line circuits as commonly found in existing houses and buildings typically receive power from a power source such as a nearby power line through three lead-in conductors including two high voltage conductors, one at opposite polarity or phase from the other and a third grounded lead-in conductor substantially at ground voltage. In such branch-line circuits, at least one branch line is interconnected to each of the nominal or high voltage lead-in conductors and terminates in one or more such branch outlets, each branch outlet having at least two power-carrying contactors, one interconnected to the third grounded lead-in conductor and the other interconnected to one of the nominal voltage lead-in conductors.

In my copending application, embodiments are disclosed by which rated current from each of two such branch outlets is combined to provide double power at double voltage in a single combiner outlet connector. Thus, double the rated power available separately from each such branch outlet is combined by suitable contactor-selector means, to draw up to rated current from each of the two oppositely phased lead-in conductors of the branch-line circuit which accordingly have double voltage impressed therebetween With such double voltage present in the circuit and in the combiner outlet connector, it is good practice to have suitable grounding means for safety purposes. Accordingly in my copending application such grounding is obtained by utilizing a third grounding contactor when available in the branch outlets being utilized, by incorporating in each electric input connector a third contactor, or by connecting the combiner circuit ground terminal to some other suitable independent grounding means.

Inasmuch as such third, grounded, contactor is not available in all existing houses and buildings, and to provide a separate grounding means is often of considerable inconvenience, a simpler, more convenient grounding means is needed.

SUMMARY OF THE INVENTION

The improved electric branch-line combiner circuitry disclosed herein readily and conveniently provides grounding means directly from one of the contactors present in each existing building branch outlet having at least two electric contactors. Thus, each such branch outlet has at least two contactors, one such contactor interconnected through a branch-line outlet in an existing branch-line circuit, such as is common in existing buildings, to one or the other of the high voltage lead-in conductors and the second such at least two contactors is interconnected to the third or grounded lead-in conductor.

After interconnecting two electric input connectors of such a branch-line combiner into two such branch outlets and having obtained double voltage at the voltage sensitive indicator by utilization of the contactor-selector means disclosed and as set forth in my copending application, Ser. No. 587,205, the contactor-selector means in the electric branch-line combiner, has not only identified which of the respective two power-carrying contactors of the two electric input connectors have the high double voltage impressed therebetween, but also, as a result, has determined that the remaining power-carrying contactor of each such branch-line outlets, into which the two electric inlet connectors are inserted, are connected to the grounded lead-in conductor and, accordingly, are grounded.

Disclosed herein, then, are circuitry and means whereby such grounding means are directly interconnected to a third or grounded combiner output connector with no need to supply a separate grounding means or to require a third grounded contactor at the branch outlets.

DETAILED DESCRIPTION OF THE INVENTION

Figure 1:
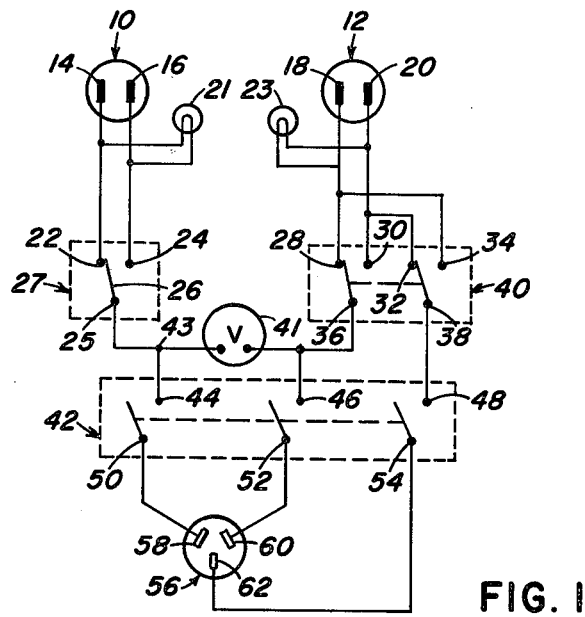
FIG. 1 illustrates schematically the electric circuit of an embodiment of the invention incorporating two manually operated switches, one single-pole double-throw and one double-pole double-throw switch for contactor interchange means, a voltmeter for voltage identification and a manually operated triple-pole single-throw switch for interconnecting the double voltage as well as the grounding connection from the two electric input connectors to selected contactors of a combiner output connector.

Referring first to the embodiment shown in FIG. 1, electric input connectors 10 and 12, which may be any commonly used 115 volt plugs, each are shown as having two combiner input power-carrying contactors herein referred to as input contactors 14, 16, 18, and 20 respectively. Each electric input connector may be any suitable type of such connector with at least two power-carrying contactors such as 14 and 16, or 18 and 20.

In this specification, unless specifically stated otherwise, where two electrical elements are "connected" one to the other, such connection is by means of suitable electric conductors.

Input contactors 14 and 16 are connected to poles 22 and 24 respectively of switch 27, and pole 25 of switch 27 is connected to pole 44 of switch 42.

Input contactor 18 is connected to poles 28 and 34 and input contactor 20 to poles 30 and 32, respectively, of switch 40. Poles 36 and 38 of switch 40 are respectively connected to poles 46 and 48 of switch 42.

A voltage sensitive indicator 41, here shown as a voltmeter, can be a neon lamp or other suitable voltage indicator which can distinguish the difference between the high voltage impressed between the two high voltage oppositely phased lead-in conductors on the one hand, and the lower voltage between one such high voltage lead-in and the grounded lead-in conductor. Such lower voltage is usually referred to by skilled workers as the "nominal" voltage, and the voltage between the two oppositely phased lead-in conductors is substantially double such nominal voltage.

Poles 50, 52, and 54 of switch 42 are respectively connected to output contactors 58, 60 and 62 of combiner output connector 56, contactors 58 and 60 being represented as power-carrying contactors, while contactor 62 is a grounding contactor as such contactors are referred to by those skilled in the art.

The embodiment of the invention of FIG. 1 operates as follows: Input connectors 10 and 12 are each inserted into a compatible branch outlet such as is commonly available as wall sockets in existing buildings. Provided, when so inserted contactors 14 and 18 are interconnected through the existing building branch-line circuit respectively one to each of the two nominal voltage (oppositely phased) lead-in conductors from which the existing branch-line circuit is energized, then, with switches 27 and 40 positioned in the throw-position shown in FIG. 1, poles 44 and 46 of switch 42 will have impressed therebetween the higher or double nominal voltage impressed between the two oppositely phased lead-in conductors as determined from voltage sensitive indicator 41. Additionally pole 48, also an element of switch 42, being interconnected to contactor 20 for the switch position shown in FIG. 1, is thus known to be grounded since in such existing branch-line circuits at least one of such contactors must be grounded and the only remaining power-carrying contactor of input connector 12 is contactor 18 which is the contactor of inlet connector 12 which has high voltage impressed thereon as described hereinbefore.

On the other hand, if contactor 16 is the contactor of input connector 10 which is connected to a high voltage lead-in conductor, then by throwing arm 26 of switch 27 to the pole 24 position, pole 44 of switch 42 will also have high voltage impressed thereon as before. Likewise, if contactor 18 of input connector 12 is connected through the existing branch-line circuit to the grounded lead-in rather than contactor 20 as discussed hereinbefore, then by throwing switch 40 to the opposite throw position the connection between contactors 18 and 20 of input connector 12 respectively to poles 36 and 38 of switch 40 will be interchanged and accordingly poles 36 and 38 respectively will have high voltage and substantially ground voltage (i.e. null voltage) impressed thereon as discussed hereinbefore. Thus, by throwing either one or both of switches 27 and 40 to one or another combination of positions, poles 44 and 46 respectively will have the same higher voltage impressed therebetween as is impressed between oppositely phased high voltage lead-in conductors again as determined from voltage sensitive indicator 41. Accordingly, pole 48 will always be grounded. However, if the ungrounded contactors of input connectors 10 and 12 are both interconnected in the existing branch-line (i.e. building circuit) to the same high voltage lead-in conductor, the higher voltage between the oppositely phased high voltage lead-in conductors will not be detected by the voltage sensitive indicator, and it will be necessary to insert either one or both input connectors to different branch outlets of the existing circuit until such connections to oppositely phased lead-in conductors is made and detected, after which the procedure described hereinbefore will provide the higher voltage with pole 48 of switch 42 always grounded. Thus, when the higher voltage is so indicated by voltmeter 41, switch 42 is closed and the combiner output connector has the correct double voltage impressed across contactors 50 and 60 with contactor 62 always grounded.

In the foregoing description, switch 27 is referred to as a single-pole double-throw switch and switch 40 is referred to as a double-pole double-throw switch, switch 42 being referred to as a triple-pole single-throw switch by those skilled in the art.

Lamps 21 and 23 connected across contactors 14 and 16 of input connector 10 and contactors 18 and 20 respectively of input connector 12 are selected to light when the nominal or lower voltage between the grounded lead-in and either of the higher voltage lead-ins is impressed between the respective contactors of each input connector and are convenient for indicating that such voltage is indeed impressed across the respective power-carrying contactors of each input connector.

Figure 2:
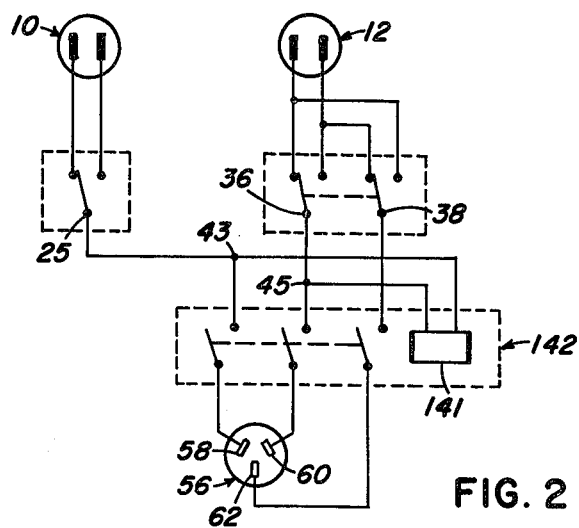
FIG. 2 illustrates another and presently preferred embodiment with triple-pole single-throw electrically actuated relay for contactor-selector identification and for interconnecting the aforedescribed circuit to the combiner outlet connector including the grounded contactor from one of the electric input connectors to the grounding contactor of the combiner output connector.

In the embodiment illustrated in FIG. 2, the branch-line combiner is substantially the same as that for FIG. 1 except that switch 42 and the voltage sensitive indicator means 41 of FIG. 1 are replaced in FIG. 2 respectively by relay means 142 and electric relay energizer 141. Energizer 141 is connected between circuit points 43 and 45 of the electric combiner instead of voltage sensitive indicator 41 of FIG. 1 and is selected to throw the triple-pole single-throw switch of relay 142 only when the higher or double nominal voltage impressed between the high-voltage lead-in conductors is impressed between the ungrounded contactors of the branch outlets as discussed hereinbefore.

With the triple-pole single-throw switch of relay 142 actuated by energizer 141, voltages can only be impressed on the respective combiner output contactors when the correct voltages intended therefor will be impressed thereon as described hereinbefore, an added safety feature.

Figure 3:
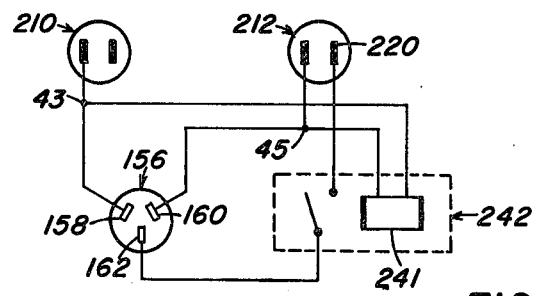
FIG. 3 illustrates a third embodiment with symmetrical electric input connectors for contactor-selector interchange means and a relay for interconnecting the circuit to the grounding contactor of the combiner output connector only when the related circuit connection is grounded.

The embodiment illustrated in FIG. 3 incorporates symmetrical electric input connectors which can be any typical two-pronged electric plug such as is commonly available and which can be inserted into typically existing branch-line outlets, such as commonly existing wall outlets, in either of two ways, so that the contactor connections between the wall between the wallbetween the wall outlet and the electric input connector can be interchanged by withdrawing the plug from the wall outlet and inserting it in a 180° rotative position.

Also, in the embodiment of FIG. 3 relay means 242 has relay energizer 241 interconnected as is energizer 141 of FIG. 2. However, relay means 242 of FIG. 3 shows a single-pole single-throw switch, the connections from circuit poles 43 and 45 being electrically connected directly to combiner outlet contactors 158 and 160 rather than through switches as in FIG. 2.

Furthermore, relay 242 can be replaced by a manually operated single-pole single-throw switch with energizer 241 being replaced by a neon lamp or other suitable voltage sensitive indicator to indicate the presence of double nominal voltage between polls 43 and 45; for which condition the single-pole single-throw switch would be closed manually to connect contactor 220 to grounding contactor 162. Additionally by eliminating the manually operated single-pole single-throw switch and by interconnecting contactor 220 of FIG. 3 directly to combiner outlet contactor 162 the same result as obtainable with the embodiments of FIGS. 1, 2, and 3 can be obtained, with the exception that to be used with such direct connection, to avoid the possibility of impressing nominal voltage on output grounding contactor 162, preferably, no device should be connected into combiner outlet connector until the voltage sensitive indicator indicates that the double-voltage is impressed on it, therefore indicating also that grounding contactor 162 is connected to the grounded branch-line contactor.

Although all of the embodiments described hereinbefore terminate in combiner output contactors, here shown as contactors of combiner output connectors, it is readily evident by those skilled in the art that the output contactors of the combiner output connector can equally well be contactors or connections directly to an electrical device which would utilize the power drawn through the output contactors without the necessity of incorporation of a separate and additional output connector and a separate and additional inlet connector for the electric cord of the electrical device to which accordingly the electric branch-line combiner of the present invention would be more permanently connected. Such elimination of the additional output and input connectors to the device to be energized would preferably incorporate means for avoiding the effects of interconnecting nominal voltage to the grounding means of the electrical device, e.g. as by incorporating a three-pole single-throw switching means such as 42 of FIG. 1, or a single-pole single-throw relay means such as 242 as illustrated in FIG. 3.

Finally, it is evident that the electric combiner circuit of the present invention also provides a convenient means solely for grounding through any three-wire existing branch-line circuit, such as that in existing buildings, when such grounding is needed for any purpose, without utilizing the higher power capability of the combiner circuit. Such grounding means alone can be provided by any of the embodiments described, e.g. by either (a) connecting into the combiner outlet connector, a matching connector having connection only to the grounded contactor 162 of FIG. 3 for example, or (b) by replacing combiner output connector 156 of FIG. 3 e.g., with a single contactor such as contactor 162.

Having thus described my invention, I now claim:

1. In an electric branch-line combiner comprising a combiner output connector, said electric branch-line combiner for combining at said combiner output connector the power from two branch outlets of an existing multi-branched electric circuit powered from two nominal voltage lead-in conductors, each having nominal voltage of opposite polarity impressed thereon, and one grounded lead-in conductor, and having one or more said branch outlets interconnected to each said nominal voltage lead-in conductor, each said branch outlet so interconnected having two branch outlet power-carrying contactors one of which is grounded, a first and a second electric input connector, each said first and second electric input connector having at least one combiner input power-carrying contactor structured to make electrical connection with one of said two branch outlet power-carrying contactors of a separate said branch outlet, said combiner output connector having a first and a second combiner output power-carrying contactor, electric power-carrying conductor means for electrically connecting each of said first and said second combiner output power-carrying contactors to only one of said at least one combiner input power-carrying contactor of one of said first and said second electric input connectors, and contactor-selector means embodied in the electric branch-line combiner for electrically interconnecting a selected one of said at least one combiner input power-carrying contactors of said first electric input connector with said first combiner output power-carrying contactor, and for electrically interconnecting a selected one of said at least one combiner input power-carrying contactors of said second electric input connector with said second combiner output power-carrying contactor, wherein the improvement comprises:

at least one of said electric input connectors having a second combiner input power-carrying contactor structured to make electrical connection with a second of said two branch outlet power-carrying contactors, said combiner output connector having a third combiner output contactor for grounding purposes, electric grounding conductor means for electrically connecting said third combiner output contactor of said combiner output connector to said second combiner input power-carrying contactor of one of said at least one said electric input connectors.

2. An electric branch-line combiner as claimed in claim 1 wherein:

said contactor-selector means comprises said first and said second electrical input connectors formed to fit symmetrically said branch outlets of said existing multi-branched electric circuit and thereby make electrical contact between said at least one combiner input power-carrying contactor of each said first and second electric input connector with either power-carrying branch outlet contactor of each said branch outlet.

3. An electric branch-line combiner as claimed in claim 2 wherein:

said contactor-selector means further comprises voltage sensing means interconnected between said electrical power-carrying conductor means electrically connecting each of said first and said second output combiner power-carrying contactors to only one of said at least one combiner input power-carrying contactor of one of said first and said second electric input connector.

4. An electric branch-line combiner as claimed in claim 3 wherein:

said electric grounding conductor means comprises an on-off switching means for opening and closing said electric grounding conductor means.

5. An electric branch-line combiner as claimed in claim 4 wherein said voltage sensing means comprises a voltage sensitive relay energizer, said on-off switching means and said voltage sensitive relay energizer form a relay switching means for closing said on-off switching means and thereby interconnecting said third combiner output contactor to said second one of said first and second combiner input contactors of one of said electric input connectors when a selected voltage is impressed across said voltage sensitive relay energizer.

6. An electric branch-line combiner as claimed in claim 1 wherein:
   each said first and second electric input connector comprises two combiner input power-carrying contactors,
   said contactor-selector means comprises single-pole double-throw switching means electrically interconnected between said two combiner input power-carrying contactors of said first electric input connector and said first combiner output power-carrying contactor, said single-pole double-throw switching means for changing electrical connection of said first combiner output power-carrying contactor from connection with one of said two combiner input power-carrying contactors of said first electric input connector to the other of said two combiner input power-carrying contactors of the same said first electrical input connector,
   double-pole double-throw switching means electrically connected between said two combiner input power-carrying contactors of said second one of said first and second electric input connectors and said third combiner output contactor and said second combiner output power-carrying contactor, said double-pole double-throw switching means for interchanging the electrical connections of said second combiner output contactor from connection with said first combiner input power-carrying contactor to connection with said second combiner input power-carrying contactor of said second electric input connector while also interchanging connection of said third combiner output contactor from connection with said second combiner input power-carrying contactor to connection with said first combiner input power-carrying contactor of said second electric input connector,
   said third output contactor, said double-pole double-throw switching means, and said electric grounding conductor means thereby providing grounding means of said third output contactor of said combiner output connector through the substantially grounded lead-in conductor of the existing multi-branched electric circuit.

7. An electric branch-line combiner as claimed in claim 6 wherein said contactor-selector means further comprises voltage sensing means interconnected between said electrical power-carrying conductor means electrically connecting each of said first and said second output combiner power-carrying contactors to only one of said at least one combiner input power-carrying contactor of one of said first and said second electric input connector.

8. An electric branch-line combiner as claimed in claim 7 wherein said electric power-carrying conductor means and said electric grounding conductor means further comprise triple-pole single-throw switching means connected between the combiner output connector and the remaining portions of the electric branch-line combiner circuit, and said triple-pole single-throw switch having two poles, one in each interconnection from each side of said voltage sensitive means to each of said first and said second combiner output contactors and a third pole in the interconnection from said third combiner output contactor.

9. An electric branch-line combiner as claimed in claim 8 wherein said triple-pole single-throw switching means further comprises a relay switching means having a relay energizer, said voltage sensing means comprising said relay energizer, said relay switching means to close said triple-pole single-throw switch only with a selected voltage impressed across said relay energizer.

10. An electric branch-line combiner as claimed in claim 9 wherein said relay energizer comprises an electromagnetic coil.

11. A grounded electric branch-line combiner as claimed in claim 9 wherein said selected voltage is substantially twice that impressed between said combiner input power-carrying contactors of each said electric input connector.

12. An electric branch-line combiner as claimed in claim 7 wherein:
   said electric grounding conductor means comprises an on-off switching means for opening and closing said electric grounding conductor means,
   said voltage sensing means comprises a voltage sensitive relay energizer, said on-off switching means and said voltage sensitive relay energizer form a relay switching means for closing said on-off switching means and thereby interconnecting said third combiner output contactor to said second one of said first and second combiner input contactors of one of said electric input connectors when a selected voltage is impressed across said voltage sensitive relay energizer.

13. In an electric branch-line grounding circuit comprising a grounding output connector, said electric branch-line grounding circuit for providing electrical grounding at said grounding output connector from two branch outlets of an existing multi-branched electric circuit powered from two nominal voltage lead-in conductors, each having nominal voltage of opposite polarity impressed thereon, and one grounded lead-in conductor, and having one or more said branch outlets interconnected to each said nominal voltage lead-in conductor, each said branch outlet so interconnected having two branch outlet power-carrying contactors one of which is grounded,
   a first and a second electric input connector, each said first and second electric input connector having at least one input contactor structured to make electrical connection with one of said two branch outlet power-carrying contactors of a separate said branch outlet,
   said electric branch-line grounding circuit having a first and a second grounding circuit output pole,
   electric conductor means for electrically connecting each of said first and said second grounding circuit output poles to only one of said at least one input contactor of one of said first and said second electric input connectors, and
   contactor-selector means embodied in the electric branch-line grounding circuit for electrically interconnecting a selected one of said at least one input contactor of said first electric input connector with said first grounding circuit output pole, and for electrically interconnecting a selected one of said at least one input contactors of said second electric input connector with said second grounding circuit output pole, at least one of said electric input connectors having a second input contactor structured to make electrical connection with a second of said two branch outlet power-carrying contactors, and electric grounding conductor means for electrically connecting said grounding output connector to said second input contactor of one of said at least one said electric input connectors.

14. An electric branch-line grounding circuit as claimed in claim 13 wherein:

said contactor-selector means comprises said first and said second electrical input connectors formed to fit symmetrically said branch outlets of said existing multi-branched electric circuit and thereby make electrical contact between said at least one input contactor of each said first and second electric input connector with either power-carrying branch outlet contactor of each said branch outlet.

15. An electric branch-line grounding circuit as claimed in claim 14 wherein:

said contactor-selector means further comprises voltage sensing means interconnected between said electrical conductor means electrically connecting each of said first and said second grounding circuit output poles to only one of said at least one input contactor of one of said first and said second electric input connector.

16. An electric branch-line grounding circuit as claimed in claim 15 wherein:

said electric grounding conductor means comprises an on-off switching means for opening and closing said electric grounding conductor means.

17. An electric branch-line grounding circuit as claimed in claim 16 wherein said voltage sensing means comprises a voltage sensitive relay energizer, said on-off switching means and said voltage sensitive relay energizer form a relay switching means for closing said on-off switching means and thereby interconnecting said grounding output contactor to said second one of said first and second input contactors of one of said electric input connectors when a selected voltage is impressed across said voltage sensitive relay energizer.

18. An electric branch-line grounding circuit as claimed in claim 13 wherein:

each said first and second electric input connector comprises two input contactors, each said contactor structured to make electrical connection with a different one of said two branch outlet power-carrying contactors of one separate said branch outlet, said contactor-selector means comprises single-pole double-throw switching means electrically interconnected between said two input contactors of said first electric input connector and said first grounding circuit output pole, said single-pole double-throw switching means for changing electrical connection of said first grounding circuit output pole from connection with one of said two input contactors of said first electric input connector to the other of said two input contactors of the same said first electrical input connector, double-pole double-throw switching means electrically connected between said two input contactors of said second one of said first and second electric input connectors and said grounding output connector and said second grounding circuit output pole, said double-pole double-throw switching means for interchanging the electrical connections of said second grounding circuit output pole from connection with said first input contactor to connection with said second input contactor of said second electric input connector while also interchanging connection of said grounding output connector from connection with said second input contactor to connection with said first input contactor of said second electric input connector, said grounding output connecter, said double-pole double-throw switching means, and said electric grounding conductor means thereby providing grounding means of said grounding output connecter through the grounded lead-in conductor of the existing multi-branched electric circuit.

* * * * *